United States Patent
Kral et al.

(10) Patent No.: US 8,171,638 B2
(45) Date of Patent: May 8, 2012

(54) PROCESS FOR PROVIDING IMPROVED ELECTRICAL PROPERTIES ON A ROLL FOR USE IN ELECTROPHOTOGRAPHY

(75) Inventors: Donal Thomas Kral, Lexington, KY (US); Scott Alan Searls, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 686 days.

(21) Appl. No.: 12/341,267

(22) Filed: Dec. 22, 2008

(65) Prior Publication Data

US 2010/0160567 A1   Jun. 24, 2010

(51) Int. Cl.
*B21K 1/02* (2006.01)
*B05D 1/40* (2006.01)

(52) U.S. Cl. .............. 29/895.3; 29/895.32; 427/481; 427/255.29; 118/416

(58) Field of Classification Search .............. 29/895.3, 29/895.32; 427/255.29, 372.2, 376.2, 481; 118/416; 524/589
See application file for complete search history.

(56) References Cited

U.S. PATENT DOCUMENTS

| | | | | |
|---|---|---|---|---|
| 3,687,704 | A * | 8/1972 | Stanley et al. .............. | 427/481 |
| 4,888,202 | A * | 12/1989 | Murakami et al. .......... | 117/105 |
| 4,972,569 | A * | 11/1990 | Aoki et al. .................. | 29/429 |
| 5,707,743 | A * | 1/1998 | Janes et al. ................. | 428/423.1 |
| 5,804,114 | A * | 9/1998 | Janes et al. ................. | 264/82 |
| 5,874,172 | A * | 2/1999 | Beach et al. ................ | 428/423.1 |
| 6,042,946 | A * | 3/2000 | Massie et al. ............... | 428/423.1 |
| 6,087,011 | A * | 7/2000 | Beach et al. ................ | 428/425.9 |
| 6,132,562 | A * | 10/2000 | Baumecker et al. ........ | 204/192.12 |
| 6,150,025 | A * | 11/2000 | Roe et al. .................... | 428/423.1 |
| 7,347,808 | B2 * | 3/2008 | Beach et al. ................ | 492/56 |
| 7,537,815 | B2 * | 5/2009 | Lahijani ..................... | 428/36.91 |
| 7,575,789 | B2 * | 8/2009 | McKeen ...................... | 428/36.9 |
| 7,588,058 | B2 * | 9/2009 | McKeen et al. ............ | 138/137 |
| 7,655,311 | B2 * | 2/2010 | Killeen ....................... | 428/423.1 |
| 7,870,877 | B2 * | 1/2011 | McKeen et al. ............ | 138/137 |
| 7,871,684 | B2 * | 1/2011 | McKeen ...................... | 428/36.9 |
| 7,985,447 | B2 * | 7/2011 | Lahijani ..................... | 427/231 |
| 2005/0016610 | A1 * | 1/2005 | Lahijani ..................... | 138/145 |
| 2005/0173012 | A1 * | 8/2005 | McKeen ...................... | 138/146 |
| 2006/0017281 | A1 * | 1/2006 | McKeen ...................... | 285/45 |
| 2006/0127622 | A1 * | 6/2006 | Mohan et al. ............... | 428/36.91 |
| 2006/0137757 | A1 * | 6/2006 | McKeen et al. ............ | 138/145 |
| 2007/0021583 | A1 * | 1/2007 | Killeen ....................... | 528/172 |
| 2009/0202715 | A1 * | 8/2009 | Lahijani ..................... | 427/183 |

* cited by examiner

*Primary Examiner* — Essama Omgba

(57) ABSTRACT

A method and system for producing rolls for electrophotography are provided. The rolls can be rotated and shifted laterally during an oxidative baking process to produce finished rolls having improved electrical and printing characteristics. The oxidation of the rolls may be controlled to provide a corresponding increase in surface electrical resistance to within plus or minus 25 microns of a selected roll thickness.

20 Claims, 3 Drawing Sheets

PROCESS FOR PROVIDING IMPROVED ELECTRICAL PROPERTIES ON A ROLL FOR USE IN ELECTROPHOTOGRAPHY

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present disclosure relates generally to rolls used in electrophotography, and, more specifically, to a process of manufacture for a roll having a surface with uniform electrical properties around its circumference.

2. Description of the Related Art

Image forming devices, such as printers, copiers, fax machines, etc., utilize a number of components to transfer toner from a toner reservoir to a photoconductor and ultimately to a sheet of paper, or other media. For example, a photoconductor may be charged utilizing a charging device and selectively discharged to form a latent image thereon. Toner may then be transferred onto the photoconductor from the reservoir via differential charging of the photoconductor, toner and developer rolls or transfer rollers. From the photoconductor, toner may then be deposited onto a sheet of paper, creating the desired image. The transferred toner may then be fused to the paper by a fuser or other fixation device or process.

Developer rolls may be solid or two-layer and may comprise a cast urethane which may be formed of a polydiene, such as polyisoprene and more specifically polybutadiene, either as a polyol or a urethane prepolymer, blended with a second polyurethane prepolymer and a conductive additive such as ferric chloride. A resistive surface layer can be produced on a cast urethane roll by baking in air at an elevated temperature. The oxidation of polybutadiene, in the presence of certain conductive metal salts, may produce a layer at the surface of the roll having relatively highly electrical resistance. The thickness and resistivity of this layer may be adjusted by varying, for instance, the polybutadiene and metal salt concentrations in the urethane, the baking time, the baking temperature, and the concentration of oxygen.

A blend of urethane precursor materials may be cast into a mold around a conductive metal shaft to form a roll, cured at a high temperature, processed via grinding to the required functional dimensions, and then baked at an elevated temperature (e.g., >80° C.) to oxidize the surface of the roller. This controlled oxidation produces a layer on the outside surface of the roll having relatively high resistivity.

Such cast urethane rolls are disclosed in U.S. Pat. Nos. 5,707,743; 5,804,114 and 5,874,172 as well as United States Patent Application Publication No. 2007/0021583, all commonly assigned to the assignee of the present disclosure and include herein in their entirety by reference.

SUMMARY OF THE INVENTION

In one aspect the present disclosure relates to a method of oxidatively baking a roll in a heated fluid flow for use in electrophotography comprising supporting a roll in a first position on a tray, wherein the roll is formed from a material that is capable of oxidation and an increase in electrical surface resistance. This may then be followed by altering the angle of the tray with respect to horizontal and moving the roll to a second position on the tray in the presence of the heated fluid and oxidizing and increasing the roll's electrical surface resistance.

In a second aspect, the present disclosure relates to a method of improving the surface electrical resistance of a roll during an oxidative baking process, the method comprising passing a heated fluid across a roll, wherein the roll is formed form a material that is capable of oxidation and an increase in electrical surface resistance. This may then be followed by shifting the position of the roll axis, rotating the roll about its axis, and oxidizing and increasing the roll's electrical surface resistance.

In a third aspect, the present disclosure relates to a method of oxidatively baking a roll in a heated fluid flow for use in electrophotography comprising supporting a roll in a first position on a tray, wherein the roll is formed from a polydiene polymer that is capable of oxidation and an increase in electrical surface resistance. This may then be followed by altering the angle of the tray with respect to horizontal and moving the roll to a second position on the tray in the presence of the heated fluid and oxidizing and increasing the roll's electrical surface resistance. The roll's oxidation and increase in electrical surface resistance is also configured to occur for a selected thickness, and the oxidation and increase in electrical resistance occurs within plus or minus 25 microns of such selected thickness.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
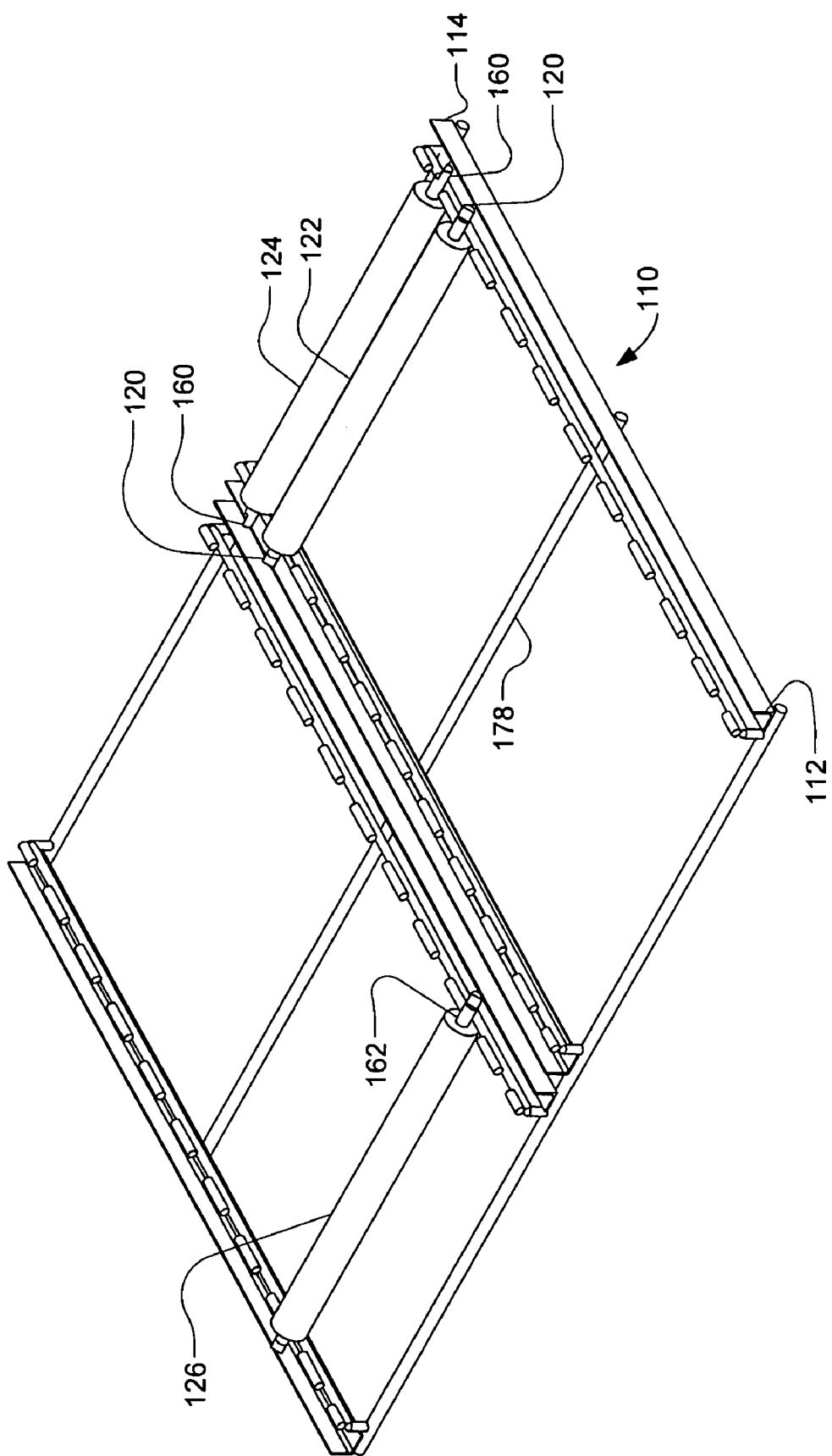
FIG. 1 is a perspective view of one embodiment of a pivotable tray for baking developer rolls.

In one aspect, a method and system for improving the electrical properties of a roller are provided. The roller may be, e.g., a developer roller used in electrophotography, such as in an electrophotgraphic printer cartridge or in an electrophotographic printer. The method can include baking the roll at an elevated temperature while rotating the roll to expose different portions of the roll surface to heated fluid flow (e.g., air or oxygen or a selected oxygen/non-oxygen gas mixture), which may then provide a relatively uniform level of heating and oxidation to the exposed surface.

The roll may include an outer layer of polymeric material that when heated, optionally in the presence of an inorganic salt, undergoes oxidation and a corresponding increase in relative electrical resistivity. The oxidation may be relatively more pronounced at the surface, i.e., from the surface to a depth of about 130 microns (μm). For example, the polymer resins may include a polymer containing some level of residual unsaturation (e.g. carbon-carbon double bonds), such as an unsaturated type diene type polymer, such as a polybutadiene or polyisoprene, and the inorganic salt may include, e.g., ferric chloride. The diene polymer may also be incorporated into a copolymer, such as a segment within a segmented copolymer within, e.g., a polyurethane type segmented copolymer structure.

During baking, the roll may move and change position as well as rotate about its axis. Rolls can therefore be rotated and/or moved laterally to expose different portions of the roll surface to different air flow influences. In one set of embodiments, this can be achieved by rolling the roll along a slot in a baking tray. The baking tray may include two parallel tracks and the tray can be tilted to initiate downward movement of the roll. The slot in the tray track can be dimensioned to limit the distance that the developer roll travels. The surface of the roll need not contact the tray as the roll may be supported at both ends by a central shaft that passes through the rotational axis of the developer roll. The two ends of the shaft can rest on two tray tracks between which the developer roll hangs. Multiple rolls may be disposed on a tray and multiple trays may be integrated together and may be controlled by a common tilting mechanism.

Roller materials of composition may often affect the mass flow and electrical charging of the toner in a printing device. Some of the factors that may directly affect toner properties are the electrical properties of the roll and how uniform these properties are around the circumference of the roll and axially from one end of the roll to the other. Since the roll rotates during printing, non-uniform electrical properties may cause the toner to vary in mass flow and charging, resulting in suboptimal print quality. Print defects such as banding, dark areas, light areas, etc. may be the result of non-uniform electrical properties. The electrical properties of the roll may include, but are not limited to, optical thickness, electrical thickness, electrical resistance and electrical eccentricity. Each of these properties can affect what is referred to as electrical uniformity.

As alluded to above, the process used for the oxidative baking of developer rolls can affect electrical uniformity. Such process parameters include, for example, time, temperature, air flow and humidity. Until recently, the electrical properties of cast developer rolls have been acceptable for producing images, but with increasing printer speeds, and new toner formulations, for example, improved uniformity of electrical properties around the circumference of the surface of the roll has become of greater interest.

Accordingly, it may now be appreciated that the distribution of air flow coming in contact with the roll during the post baking process may influence the quality of the electrical properties of the roll. The processing techniques herein may place multiple rolls in stacks of trays. When these rolls are not moved, an uneven flow of air may be delivered to different portions of the circumferential surface of the roll. Current testing has demonstrated that this variation can lead to electrical nonuniformities on the roll surface (again, the surface that may come in contact with another electrophotographic printer component). In one set of embodiments, a method has been developed that provides for rotational and/or lateral movement of the rolls during the baking process. This method has been shown to improve electrical uniformity of the developer roll.

In one aspect, rolls may be rotated in place to expose different portions of the roll circumference to the air flow. In one embodiment each roll may be placed in a "rotisserie" configuration in which each roll may rotated about its axis during the oxidative baking process. The central shaft of each roll can be driven to rotate by connecting the central shaft either directly or indirectly to a motor. The opposing end of the shaft may rotate passively in a guide or may be connected to additional rolls which will also be rotated. The roll may then be rotated while exposed to heated air (for instance, for about 8-10 hours at 110-120° C.).

Compared to statically baked rolls (rolls which undergo no movement during the oxidative bake process) the electrical uniformity of rotated rolls herein demonstrates relatively greater overall tolerance in the relative depth of oxidation that may be observed. For example, according to the procedures outlined herein, oxidation on a given roller (and corresponding increase, e.g., in surface electrical resistance) can be controlled to occur, for a given target oxidation thickness, to fall within the range of up to plus or minus 25 µm of such target oxidation thickness (i.e., anywhere in the range of +/−1-25 µm). Accordingly, it may be appreciated that for a given target oxidation thickness, such as a target oxidation thickness of 80 microns, the present disclosure provides that one may control oxidation to fall within the thickness range of 55 microns to 105 microns. Preferably, however, the target oxidation thickness may be controlled to occur with a tolerance range of less than +/−25 µm, such as a value of +/−15 µm. For example, for a target oxidation thickness of 80 µm, the present disclosure provides that one may provide rollers where the thickness of surface oxidation falls in the range of 65 µm to 95 µm.

In another aspect, a roll, such as a developer roll, may be moved laterally and/or rotated continuously or intermittently during the oxidative baking process. A system may include a tray or series of trays constructed and arranged to be tilted to different angles. Tilting can allow the supported developer rolls to rotate and/or shift position by rolling under the influence of gravity. The rolls may then move both horizontally and vertically at the same time. Each tray may include one or more slots constructed to receive the central shaft extending from the roll. The roll may be passively supported by the tray without fixing or attaching the roll to the tray. As the tray is tipped, the roll may rotate and shift position until it reaches the downhill or lower edge (the "stop") of the slot. In some embodiments the roll may continue rotating for a period of time after lateral movement has stopped and the shaft has contacted the edge of the slot. The total amount of rotation may be at least partially random, resulting in unpredictable portions of the roll being exposed to the most direct air flow. Rolls may be rotated about their axes, for example, by 90°, 180°, 360° or more. After moving and/or rotating in one direction the rolls may be moved and/or rotated in the opposite direction.

FIG. 1 provides a perspective view of a developer roll tray 110 that includes three developer rolls 122, 124 and 126 supported in the tray by roll shafts 120, 160 and 162 respectively. The tray 110 may be supported by a fixed pivot rod 178 that provides a fulcrum about which the tray 110 may be tipped by raising or lowering either end 112 or 114 of the tray. Pivot rod 178 may rest on a stationary framework (not shown). The tray 110 may be mounted in an open sided rack (not shown) which may include a tipping mechanism, such as reciprocating cylinders, which may raise and lower an end of the tray 110 relative to the pivot rod 178.

Figure 2:
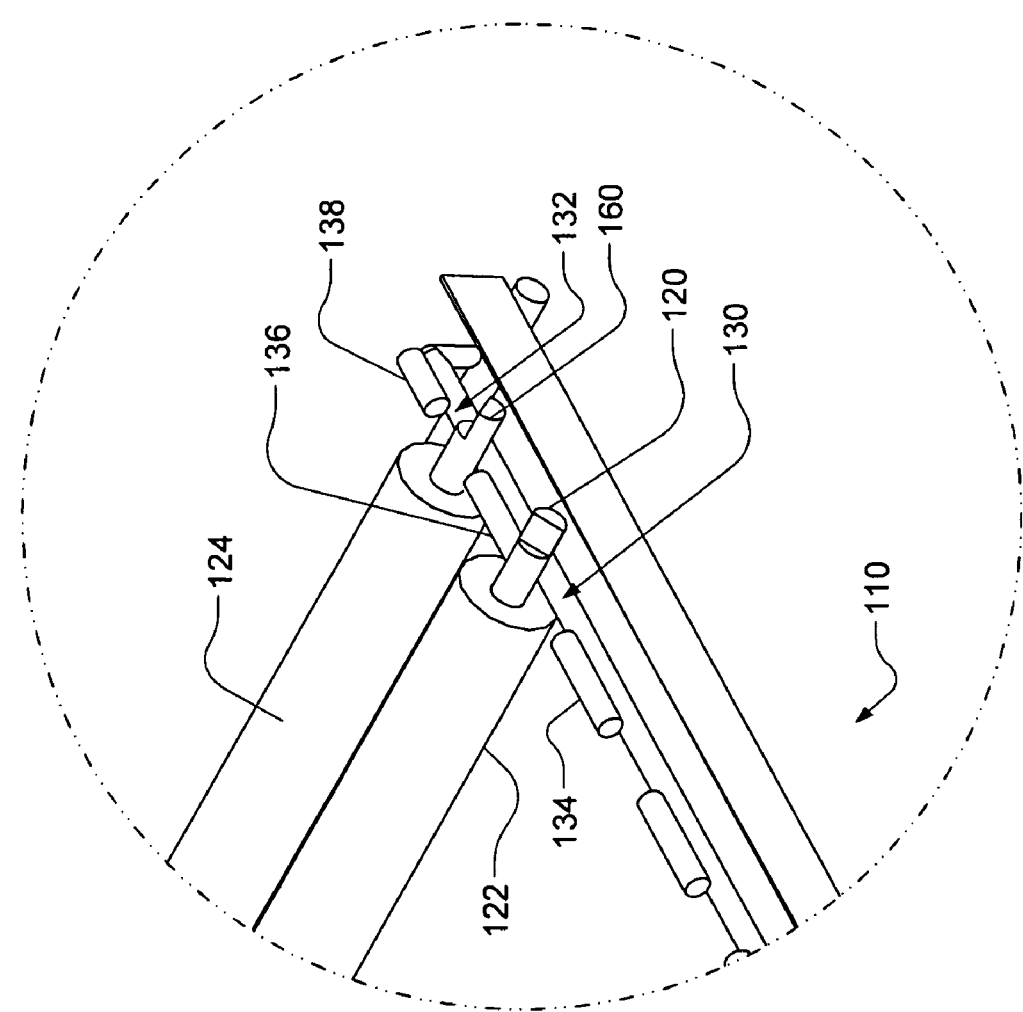
FIG. 2 is an enlarged view of a portion of FIG. 1, illustrating the spacing between the stops of the pivoting rack.

As shown in the enlarged perspective view of FIG. 2 the tray may include a series of slots 130, 132, etc. that are separated by a series of stops 134, 136, 138 etc. The slots and stops may be spaced to result in a desired amount of rotation and/or lateral shift of the rolls when the tray is tipped from a first position to a second position. In one embodiment the distance between the first position and the second position is greater than about 0.25 of the circumference of the roll shaft.

Prior to baking and oxidation of the unsaturated polymeric resin, rolls may be placed in the slots so that each roll is at either the right or left end of the slot. To facilitate this, tray 110 may be tipped in one direction so that it is not level with respect to horizontal.

Figure 3:
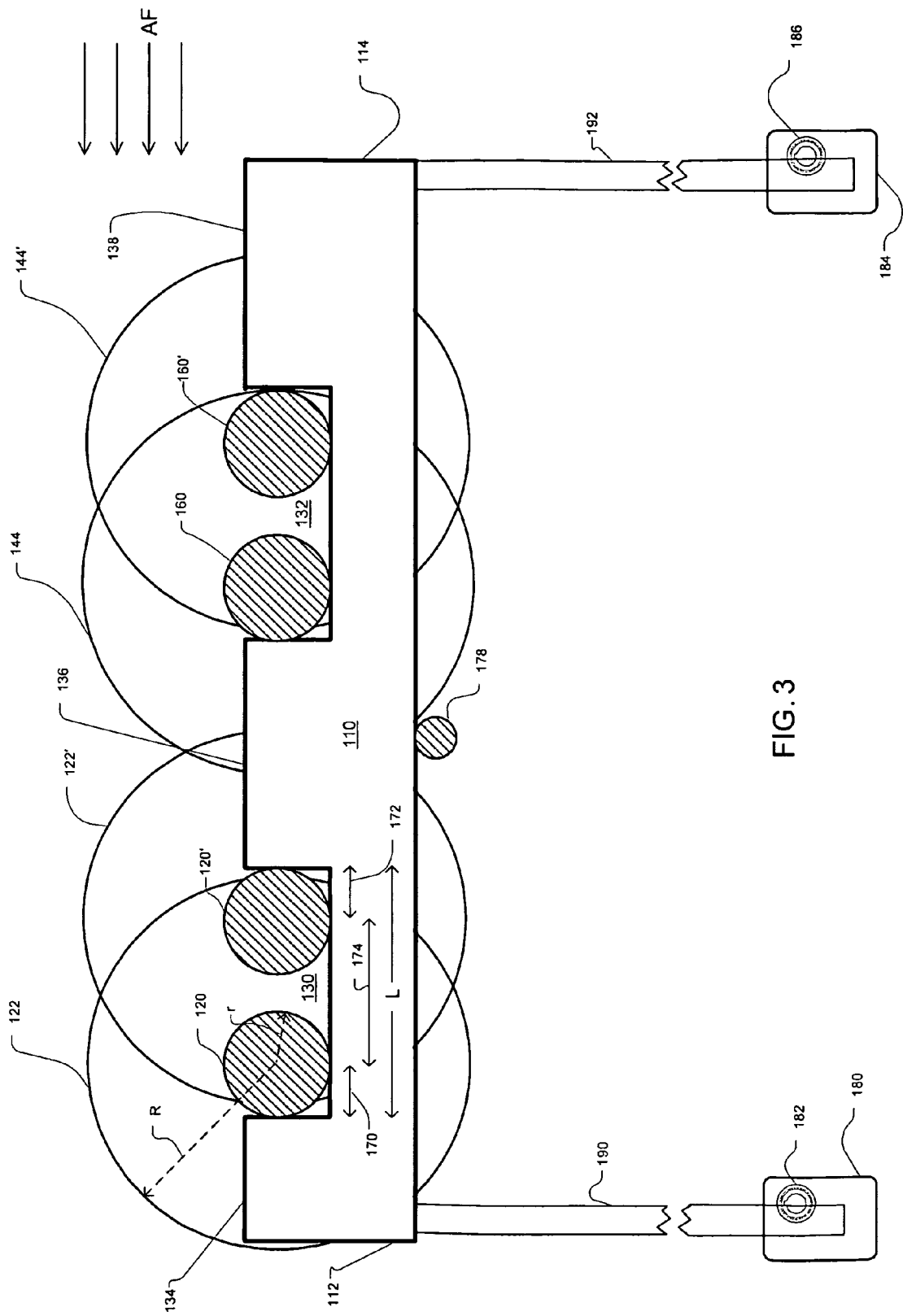
FIG. 3 provides a schematic view of a portion of a tray showing two different positions for each of two developer rolls.

FIG. 3 provides a schematic side view of an embodiment that may be identical or similar to that shown in FIG. 2. Airflow "AF" indicates the direction of air flow across the rack. Airflow may be consistent in direction, velocity and temperature or may be altered. Although only slots 130 and 132 are shown, many embodiments include a greater number of slots to accommodate a plurality of developer rolls. In FIG. 3 each of rolls 122 and 144 are shown in two positions. Roll 122 includes central shaft 120 and is shown positioned on the left side of slot 130. When tray 110 is tipped downward to the right, the roll 122 and shaft 120 advance to position 122' and 120' on the right side of slot 130. The same movement occurs for roll 144 with shaft 160 which advances to position 144' and 160" when the tray is tipped to the right. Thus, both rotational and linear motion may occur simultaneously and the axis of each roll can shift position as the roll rotates about its axis. Arrow "r" indicates the radius of central shaft 120. Arrow "R" indicates the radius of developer roll 122. Distances 170 and 172 may be equal to "r". Distance 174 is the length of travel of the roll when it moves the length of the slot and is equal to the distance between stops 134 and 136 minus the diameter of the shaft. In one embodiment, the slots may be constructed to provide for roll rotation of 180°. In this case, the total length L of slot 130, 132 may be calculated by determining the circumference (C) of the metal shaft, dividing such circumference by 2 and adding the diameter (D) of the shaft; that is $L=(C/2)+D$.

In some embodiments the stops and slots are sized to prevent any contact between the surfaces of adjacent rolls. For instance, stop 136 that separates slots 130 and 132 may be greater than or equal to 2 times the radius of the roll minus two times the radius of the roll shaft. In the illustrated embodiment this is equal to $2(R)-2(r)$. Using these dimensions the rolls will not contact each other even if roll 144 has remained stationary in the left side of slot 132 when roll 122 reaches position 122'. Slots and/or stops may be adjustable to accommodate rolls having different diameters or shafts of different diameters. For instance, stop 110 may be modular and may include two or more pieces that can be removed or added to vary the length of slot 130. In some cases, stops may be entirely removed from the tray to expand slot length.

Tray 110 may be loaded into an open rack and placed in an oven for oxidative baking at, for instance, 8-10 hours at 110-120° C. Tray 110 may be supported by pivot rod 178 (attached or unattached) that provides a fulcrum on which the tray can be tilted. In other embodiments the pivot rod is attached to the tray and may itself be rotated to provide a rocking motion to the tray. One or more support rods 190, 192 may be affixed to tray 110. The support rods may be pivotally joined to the tray so that the rod can maintain a vertical orientation when the tray is tipped. Support rods 190 and 192 may be controlled by reciprocators 180 and/or 184. A reciprocator may be constructed and arranged to shift a support rod upwardly, downwardly or both. Some embodiments include a single reciprocator that provides both upward and downward control. Other embodiments may include two or more reciprocators that each supply movement in one direction. Tray 110 may be biased in a first position and may be shifted to a second position by reciprocator 180. For instance, a spring may be used to bias the tray in a position with right end 114 below left end 112, and reciprocator 180 may be actuated to overcome the bias and to shift the tray 110 to a second position where right end 114 is above left end 112. Reciprocators may include activators 182 and 186 capable of supplying upward and or downward motion. Activators include, for example, mechanical, pneumatic, hydraulic and electrical devices capable of promoting upward and/or downward tilting of the tray. The reciprocator may be in communication with a controller that can be programmed to activate one or more reciprocators at predetermined or random times. The system may also include a detector, such as a position sensor, that is in communication with the controller and can indicate, for instance, whether the tray is tilted left, tilted right or is level. The tray 110 may be tilted to the left or right by an amount adequate to initiate rolling of the developer rolls 122 and 144 positioned in slots 130 and 132. For instance, the tray may be tilted down to the left or down to the right by 1 degree, 2 degrees, 3 degrees or more.

When roll 122 moves to position 122' it may obtain enough angular momentum that it continues to rotate after contacting stop 110. The amount of continued rotation may be a function of the friction between shaft 120 and tray 110 as well as the angular momentum achieved by the roll between positions 122 and 122'. Due to the difference in vertical distance traveled, a roll positioned near pivot rod 178 may travel more slowly than a roll positioned near end 112 or end 114. This may mean that some rolls achieve a greater amount of rotation than do other rolls. Random rotation of a roll may result in improved electrical properties. Therefore, randomness may be inserted into the tipping procedure by altering, for example, the speed of upward or downward movement and the frequency of such movement.

Systems may include one or more trays and trays may be arranged side-by-side, end-to-end, or above and below. Two or more trays may be controlled by one or more common reciprocators. The trays may be modular in design and may be loaded and/or unloaded independently. Trays may be configured to hold rolls of the same or different dimensions.

Two sets of exemplary rolls were tested to determine electrical uniformity across the surface of each roll. The rolls were structurally and compositionally identical and were baked under identical conditions of temperature and air flow. The first group of rolls (Group I) was statically supported in racks during the baking process. The second group of rolls (Group II) was rotated and shifted in position using a tray and rack system as shown in FIGS. 1, 2 and 3. The rolls had a diameter of 20.11 mm, ±0.11 mm, and included an outer layer of polybutadiene. Each group was baked for about 13 hours at 100° C. and was exposed to an average lateral air flow of 500 ft./minute. However, the range of air flow that the rollers experienced was between 300 ft./minute to 700 ft./min. Electrical uniformity was evaluated by measuring electrical eccentricity at 1000 V around the circumference of each roll. Group II rolls were shifted from one end of the slot to the other by changing the angle of the tray to promote rolling of the developer rolls, under only gravitational force, to the opposite end of each slot. The tray was pivoted on a pivot rod and tray position alternated between left side down and right side down at a frequency of 30 seconds. However, the frequency may vary between 10 seconds to 5 minutes. The tray was maintained in each of the two positions for an equivalent amount of time over the baking period. Each rack supported 20 trays with ten rolls per tray. Rolls to be analyzed were selected from different portions of different trays to assure that representative rolls were tested. The 12 static rolls (Group I) that were tested exhibited an average electrical eccentricity of 0.816 (eccentricity of 1 being perfect, no variation around the roll). The 22 rolls that were moved and rotated (Group II) during baking exhibited an average electrical eccentricity of 0.968. Results for Group I are provided in Table 1 and results for Group II are provided in Table II. Table 1 provides the oven position of each roll tested (top, bottom or middle and right or left) as well as electrical testing results. Table II provides the tray number as well as the roll's position in each tray (Left, Middle or Right). Results indicate much improved electrical eccentricity, and therefore electrical uniformity, in Group II. Additional testing (not shown) on similar developer rolls that were rotated at consistent speed (rotisserie method) without any lateral movement indicated an eccentricity of 0.90. Thus, favorable eccentricity values were obtained with Group II rolls when compared to each of the static rolls and the rolls that were rotated without lateral movement.

It should be noted that in the above tables, reference to the indicated data in the columns may be understood as follows:

% RSD (channel avg.) Relative standard deviation (% RSD channel avg.) is found by calculating the standard deviation of the 357 resistance data points from each channel (2-8), and calculating the average of those individual channel standard deviations. It's expressed as a percent of the average resistance.

% RSD (entire roll avg.) A separate metric (% RSD entire roll avg.) is found by calculating the standard deviation of all the resistance data points from channels 2-8 (a total of 2499 data points). In this case, if there is a large inconsistency of the resistance data from channel to channel, this metric will be much higher than the % RSD channel avg.

Avg. Eccentricity This eccentricity metric is a value showing how circular the resistance data is. It is found by taking the resistance at 0° (point 1) divided by the resistance at 90° (point 90). An IF command may be used in Excel to make sure

TABLE 1

| Oven Position | Roll ID | Resistance data | | | Eccentricity | | | Rate of change Max. |
|---|---|---|---|---|---|---|---|---|
| | | Avg. (ohm) | % RSD (channel avg.) | % RSD (entire roll avg.) | Avg. | True Min. | Sweep Min. | data |
| Top R | 202 | 1.3E+09 | 10% | 17% | 0.88 | 0.71 | 0.67 | 4.2E+07 |
| Top R | 204 | 1.1E+09 | 12% | 18% | 0.86 | 0.69 | 0.62 | 2.7E+07 |
| Middle R | 209 | 9.7E+08 | 6% | 20% | 0.93 | 0.74 | 0.72 | 2.2E+07 |
| Middle R | 212 | 1.4E+09 | 11% | 18% | 0.87 | 0.63 | 0.63 | 5.7E+07 |
| Bottom R | 214 | 1.0E+09 | 14% | 20% | 0.85 | 0.60 | 0.58 | 3.3E+07 |
| Bottom R | 216 | 7.4E+08 | 25% | 29% | 0.75 | 0.41 | 0.38 | 2.4E+07 |
| Top L | 221 | 8.8E+08 | 12% | 28% | 0.86 | 0.54 | 0.51 | 2.5E+07 |
| Top L | 224 | 5.5E+08 | 29% | 30% | 0.72 | 0.30 | 0.27 | 1.5E+07 |
| Middle L | 226 | 9.7E+08 | 15% | 19% | 0.85 | 0.60 | 0.55 | 2.4E+07 |
| Middle L | 228 | 8.2E+08 | 17% | 20% | 0.81 | 0.55 | 0.53 | 1.8E+07 |
| Bottom L | 233 | 4.4E+08 | 45% | 47% | 0.62 | 0.18 | 0.16 | 1.1E+07 |
| Bottom L | 236 | 7.6E+08 | 21% | 27% | 0.78 | 0.46 | 0.45 | 2.2E+07 |

TABLE 2

| Tray # | Position in trays | Roll ID | Resistance data | | | Eccentricity | | | Rate of change Max. |
|---|---|---|---|---|---|---|---|---|---|
| | | | Avg. (ohm) | % RDS (channel avg.) | % RDS (entire roll avg.) | Avg. | True Min. | Sweep Min. | data |
| 1 | L | 38 | 1.0E+09 | 2% | 5% | 0.98 | 0.93 | 0.91 | 1.4E+07 |
| 1 | M | 42 | 1.0E+09 | 1% | 5% | 0.98 | 0.92 | 0.89 | 1.8E+07 |
| 1 | R | 35 | 1.1E+09 | 2% | 6% | 0.98 | 0.91 | 0.86 | 2.9E+07 |
| 5 | L | 50 | 1.0E+09 | 4% | 7% | 0.96 | 0.85 | 0.83 | 2.7E+07 |
| 5 | M | 24 | 9.4E+08 | 2% | 5% | 0.97 | 0.90 | 0.87 | 1.6E+07 |
| 5 | M | 62 | 9.6E+08 | 2% | 5% | 0.97 | 0.92 | 0.91 | 1.8E+07 |
| 5 | R | 17 | 1.1E+09 | 2% | 6% | 0.98 | 0.93 | 0.91 | 2.1E+07 |
| 9 | L | 6 | 1.0E+09 | 3% | 5% | 0.96 | 0.89 | 0.86 | 2.3E+07 |
| 9 | M | 79 | 9.3E+08 | 3% | 7% | 0.96 | 0.87 | 0.86 | 1.3E+07 |
| 9 | R | 5 | 1.1E+09 | 2% | 7% | 0.97 | 0.91 | 0.88 | 2.6E+07 |
| 13 | L | 9 | 1.0E+09 | 2% | 6% | 0.98 | 0.92 | 0.91 | 1.8E+07 |
| 13 | M | 10 | 1.1E+09 | 4% | 6% | 0.95 | 0.86 | 0.79 | 2.4E+07 |
| 13 | M | 52 | 1.0E+09 | 1% | 7% | 0.98 | 0.93 | 0.91 | 3.3E+07 |
| 13 | R | 82 | 1.2E+09 | 5% | 9% | 0.94 | 0.83 | 0.80 | 2.8E+07 |
| 16 | L | 87 | 9.2E+08 | 2% | 5% | 0.97 | 0.91 | 0.88 | 2.0E+07 |
| 16 | M | 88 | 9.7E+08 | 3% | 7% | 0.96 | 0.82 | 0.79 | 1.7E+07 |
| 16 | M | 103 | 1.1E+09 | 2% | 6% | 0.98 | 0.91 | 0.89 | 2.7E+07 |
| 16 | R | 93 | 1.1E+09 | 2% | 5% | 0.98 | 0.89 | 0.88 | 3.4E+07 |
| 19 | L | 53 | 8.3E+08 | 5% | 7% | 0.94 | 0.87 | 0.83 | 1.1E+07 |
| 19 | M | 2 | 9.1E+08 | 1% | 6% | 0.98 | 0.94 | 0.91 | 1.3E+07 |
| 19 | M | 54 | 1.0E+09 | 4% | 8% | 0.96 | 0.87 | 0.84 | 1.9E+07 |
| 19 | R | 100 | 1.1E+09 | 4% | 7% | 0.95 | 0.87 | 0.80 | 2.8E+07 | it's always the lower number divided by the higher number. The metric has a range from 0-1 with 1 being perfectly uniform. The calculation is repeated around the entire roll (point 2/point 91, etc.), and when the calculation makes it to the end of the data (point 268/point 357) it must be cycled back (point 269/point 1) to complete the circle.

True Min. Eccentricity. In order to find a better correlation between electrical uniformity and print defects, a minimum eccentricity was suggested. A true minimum eccentricity is the absolute lowest eccentricity value out of all the calculated values from channels 2-8.

Sweep Min. In order to find resistance data discrepancies even worse than the true minimum eccentricity and perhaps not located at a 90° angle like eccentricity, the "sweep" was developed. The sweep is calculated by finding the minimum resistance in each channel (2-8) and dividing that by the maximum resistance from each channel. This metric was added when 1000 volts was used.

Max. Rate of Change. The rate of change was found to be another means of identifying possible defects in a roll. It is calculated by taking the average of resistance points 1 and 3, then subtracting that from point 2, and displaying the absolute value to make the number positive. This calculation is then repeated over the entire roll. The maximum of all rate of change values from channels 2-8 are shown in the tables.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

What is claimed is:

1. A method of oxidatively baking a roll in a heated fluid flow for use in electrophotography, comprising:
   supporting said roll in a first position on a tray, wherein said roll is formed from a material that is capable of oxidation and an increase in electrical surface resistance;
   altering the angle of the tray with respect to horizontal; and
   moving said roll to a second position on the tray in the presence of said heated fluid and oxidizing and increasing the roll's electrical surface resistance;
   wherein said roll has a shaft in which a distance between the first position and the second position being greater than about 0.25 of the circumference of said shaft.

2. The method of claim 1 wherein said roll oxidation and increase in electrical surface resistance is configured to occur for a selected thickness, and said oxidation and increase in electrical resistance occurs within plus or minus 25 microns of said selected thickness.

3. The method of claim 1 wherein said roll oxidation and increase in electrical surface resistance is configured to occur for a selected thickness, and said oxidation and increase in electrical resistance occurs within plus or minus 15 microns of said selected thickness.

4. The method of claim 1 wherein the roll rotates at least 90 degrees between the first position and the second position.

5. The method of claim 1 further comprising baking the roll at greater than 80° C. for greater than one hour.

6. The method of claim 1 wherein the roll is comprised of a polydiene polymer.

7. The method of claim 1 wherein the roll is comprised of a copolymer containing a polydiene component.

8. The method of claim 1 further comprising passing said heated fluid across the tray at a selected direction and velocity.

9. The method of claim 1 wherein said tray includes slots, and further comprising supporting the roll by contacting opposing ends of the roll's shaft to said slots in the tray without fixed attachment.

10. The method of claim 9 wherein the rolling step occurs in an oven at elevated temperature.

11. The method of claim 1 comprising altering the angle of the tray with respect to horizontal a second time to move the roll back to the first position.

12. The method of claim 1 wherein a plurality of rolls are supported on said tray and altering the angle of said tray results in rolling said plurality of rolls.

13. A method of improving the surface electrical resistance of a roll during an oxidative baking process, the method comprising;
   positioning said roll on a tray;
   passing a heated fluid across said roll, wherein said roll is formed from a material that is capable of oxidation and an increase in electrical surface resistance;
   shifting the position of a roll's axis on the tray;
   rotating said roll about its axis; and
   oxidizing and increasing the roll's electrical surface resistance;
   wherein said roll has a shaft in which a distance of the position shifting of the roll's axis being greater than about 0.25 of the circumference of said shaft.

14. The method of claim 13 wherein said roll oxidation and increase in electrical surface resistance is configured to occur for a selected thickness, and said oxidation and increase in electrical resistance occurs within plus or minus 25 microns of said selected thickness.

15. The method of claim 13 wherein said roll oxidation and increase in electrical surface resistance is configured to occur for a selected thickness, and said oxidation and increase in electrical resistance occurs within plus or minus 15 microns of said selected thickness.

16. The method of claim 13 further comprising supporting two ends of said shaft of the roll on the tray without fixed attachment.

17. The method of claim 13 wherein the roll is comprised of a polydiene polymer.

18. The method of claim 13 wherein the roll is comprised of a copolymer containing a polydiene component.

19. The method of claim 13 wherein shifting and rotating are performed simultaneously.

20. A method of oxidatively baking a roll in a heated fluid flow for use in electrophotography comprising:
   supporting said roll in a first position on a tray, wherein said roll is formed from a polydiene polymer that is capable of oxidation and an increase in electrical surface resistance;
   altering the angle of the tray with respect to horizontal; and
   moving said roll to a second position on the tray in the presence of said heated fluid and oxidizing and increasing the roll's electrical surface resistance,
   wherein said roll oxidation and increase in electrical surface resistance is configured to occur for a selected thickness, and said oxidation and increase in electrical resistance occurs within plus or minus 25 microns of said selected thickness, and
   wherein said roll has a shaft in which a distance between the first position and the second position being greater than about 0.25 of the circumference of said shaft.

* * * * *